United States Patent
Duff (10) Patent No.: US 10,013,775 B2
(45) Date of Patent: Jul. 3, 2018

(54) DEEP IMAGE COMPRESSION USING LIE ALGEBRAS

(71) Applicant: Pixar, Emeryville, CA (US)

(72) Inventor: Thomas Douglas Selkirk Duff, Berkeley, CA (US)

(73) Assignee: Pixar, Emeryville, CA (US)

( * ) Notice: Subject to any disclaimer, the term of this patent is extended or adjusted under 35 U.S.C. 154(b) by 61 days.

(21) Appl. No.: 15/135,392

(22) Filed: Apr. 21, 2016

(65) Prior Publication Data

US 2016/0314598 A1 Oct. 27, 2016

Related U.S. Application Data (60) Provisional application No. 62/151,230, filed on Apr. 22, 2015, provisional application No. 62/280,490, filed on Jan. 19, 2016.

(51) Int. Cl.
*G06T 9/00* (2006.01)
*G06T 15/50* (2011.01)

(52) U.S. Cl.
CPC ............ *G06T 9/00* (2013.01); *G06T 15/503* (2013.01); *G06T 2210/62* (2013.01)

(58) Field of Classification Search
CPC ....... G06T 15/08; G06T 15/50; G06T 15/503; G06T 15/506; G06T 15/60; G06T 15/80
See application file for complete search history.

(56) References Cited

PUBLICATIONS

Kainz, Florian. "Interpreting OpenEXR deep pixels" 2013. Industrial Light & Magic; http://www.openexr.com/InterpretingDeepPixels.pdf.*
Hillman, Peter. The theory of openexr deep samples. Tech. rep., Weta Digital Ltd, 2013.*
Dana H. Ballard, "Strip Trees: A Hierarchical Representation for Curves", Communications of the ACM, May 1981, vol. 24, No. 5, 12 pages.

* cited by examiner

*Primary Examiner* — Daniel Hajnik
(74) *Attorney, Agent, or Firm* — Patterson + Sheridan, LLP (57) ABSTRACT

Systems, method, and computer program products for compressing a deep image comprising a plurality of voxels by, for each of the plurality of voxels, converting a voxel value to a corresponding value in a Lie algebra based on a logarithmic mapping function, interpolating a first subset of the plurality of values in the Lie algebra using a linear interpolation function applied to a first endpoint and a second endpoint of a first voxel column of the deep image, and upon determining that a deviation of the interpolation of each value in the first subset of the plurality of values does not exceed a threshold, storing an indication of the first endpoint, the second endpoint, and the respective values in the Lie algebra corresponding to the first and second endpoints.

20 Claims, 6 Drawing Sheets

DEEP IMAGE COMPRESSION USING LIE ALGEBRAS

CROSS-REFERENCE TO RELATED APPLICATIONS

This application claims benefit of United States provisional patent application Ser. No. 62/151,230, filed Apr. 22, 2015, which is incorporated herein by reference in its entirety. This application claims also benefit of United States provisional patent application Ser. No. 62/280,490, filed Jan. 19, 2016, which is incorporated herein by reference in its entirety.

BACKGROUND

Field of the Invention

Embodiments of the disclosure relate to computer graphics. More specifically, embodiments disclosed herein relate to compressing deep images using Lie algebras.

Description of the Related Art

Generally, in computer graphics, colors are represented by red green blue alpha (RGBA) values per pixel. An image may be represented by an array of RGBA values. In such implementations, the red, green, and blue values represent the respective intensities of the primary red, green, and blue colors, which, when added together, produce a color. The alpha value represents the opacity of the pixel, or how much of the background is obscured (where, for example, on a scale of zero to one, an alpha value of zero means a pixel is fully transparent, and an alpha value of one means the pixel is opaque). Stated differently, the pixel value can be considered to be a pair of channels A=[a, $\alpha$], where a is the amount of new light emitted from A, and a is the amount of light that A blocks from shining through it from outside sources. The quantity a may either be an RGB vector, or a scalar representing monochrome intensity. A pixel blocks no incoming light (or is transparent) when $\alpha$=0, and blocks all of the light (or is opaque) when $\alpha$=1.

The alpha values facilitate digital image compositing, which is a component of computer graphics technology. Generally, compositing is the combining of different visual elements into a single image (or single frame of a video). Stated differently, composting facilitates layering of different images or objects together into a composite image. By providing alpha values, computer graphics rendering engines are able to determine what objects should be visible when an image (or scene) is rendered. For example, a fully opaque object may obscure objects that are occupying the same 2-dimensional space.

However, conventional compositing techniques traditionally require the depth ordering of each visual element (e.g., each image being composited, or elements thereof) to be known a priori. In particular, conventional compositing techniques have no intrinsic way to deal with elements whose depth order may vary from pixel to pixel. Even more problematic are volumetric elements such as clouds, whose emission and attenuation may occupy extended depth regions. Combining two clouds requires computing new pixel values for regions that overlap in depth, something that conventional compositing techniques cannot compute directly. Therefore, for some objects such as clouds, murky water, and cloudy glass, conventional compositing techniques do not produce optimal results.

SUMMARY

In one embodiment, a method for compressing a deep image comprising a plurality of voxels comprises for each of the plurality of voxels, converting a voxel value to a corresponding value in a Lie algebra based on a logarithmic mapping function, interpolating a first subset of the plurality of values in the Lie algebra using a linear interpolation function applied to a first endpoint and a second endpoint of a first voxel column of the deep image, and upon determining that a deviation of the interpolation of each value in the first subset of the plurality of values does not exceed a threshold, storing an indication of the first endpoint, the second endpoint, and the respective values in the Lie algebra corresponding to the first and second endpoints.

Other embodiments disclosed herein include systems, computer-readable storage media, and other apparatuses configured to execute the method to compress the deep image.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein leverage Lie group structures to provide an advanced image compression technique that outperforms existing compression methods. Generally, a deep image may be represented by a voxel array. The voxel array may include red, green, blue, and alpha values for each voxel in the array. Embodiments disclosed herein may then convert the voxel array from an Over group (which is a Lie group) to the corresponding Lie algebra. To compress the deep image, embodiments disclosed herein may construct interpolants using a recursive binary subdivision. For a given range of voxels, embodiments disclosed herein identify the voxel that deviates most from the interpolant determined by a set of endpoints. If the deviation of this voxel is below a threshold, the binary subdivision is complete. However, if the deviation is above the threshold, embodiments disclosed herein add a control point (also referred to as a breakpoint) at the deviating voxel, thereby dividing the array into two subarrays. Embodiments disclosed herein many then repeat the binary subdivision using the two subarrays until suitable interpolants are generated.

To reconstruct the deep image, the generated interpolants may be used to linearly interpolate intermediate pixel values in the Lie algebra. The pixel values in the Lie algebra may then be mapped back to the Over group using an exponential map. The resulting voxels may then be composited together in depth order to create the deep image.

A color with opacity information attached (which may be referred to herein as "pixel values" rather than "colors" to emphasize the opacity channel), is a pair of channels $A=[a, \alpha]$, where a is amount of new light emitted from A, and a is the fraction of light that A blocks from shining through it from behind. In image compositing, the "over" operator describes the result of stacking two or more pixels on top of one another and look through them from the top to the bottom. The result one would see looking at the stack of pixels from the top is the emission of the top pixel in the stack combined with the amount of the lower pixel(s) that the alpha channel a of the top pixel allows to shine through from below. Therefore, the over operator may be defined by the following equation:

$$A \text{ over } B \stackrel{def}{=} A + \overline{\alpha}B \quad \text{(equation 1)}$$

Equivalently, $$[a,\alpha] \text{ over } [b,\beta]=[a+\overline{\alpha}b,\alpha+\overline{\alpha}\beta] \quad \text{(equation 2)}$$

If $\alpha$ is the opacity value, then $\overline{\alpha}$, defined as $\overline{\alpha}=1-\alpha$, is the corresponding transmittance, indicating how much of the background $\alpha$ allows to show through. Pixel values with $\alpha \neq 1$ form a group with the "over" operator as the group operator. This group is referred to herein as "Ov". Opaque pixel values (e.g., those with $\alpha=1$) are excluded from the Ov group because their inverse cannot be computed. One property of Ov is that the over operator and the inverse are smooth. That is, small changes in their operands produce correspondingly small changes in their results. Groups in which the group operator and the inverse are smooth functions of their operands are known as Lie groups. Therefore, Ov is a Lie group. Lie groups generally combine the ideas of smooth manifold and group in a way that makes them useful in many settings, such as differential geometry and physics.

Every Lie group has an associated linearized structure called a Lie algebra, which may be described as being the tangent space of the identity. A Lie algebra is a vector space with an associated binary operator called the Lie bracket which measures the extent to which the underlying Lie group is non-commutative. The Lie algebra of the Lie group Ov may be referred to herein as "ov".

Pixel values may be mapped to matrices, such as the following 2×2 upper-triangular real matrix:

$$A \Rightarrow \begin{bmatrix} \overline{\alpha} & a \\ 0 & 1 \end{bmatrix} \quad \text{(equation 3)}$$

Using this matrix representation, multiplication of two matrixes corresponds to the over operator, and the matrix inverse corresponds to the pixel inverse.

One feature of Lie algebras and Lie groups is the existence of a mapping from the Lie algebra to the Lie group, referred to as an exponential map, as many operations in a Lie group are more easily carried out by mapping them into the appropriate Lie algebra, where everything is linear. Groups of square matrices under multiplication are Lie groups, and their exponential map is the matrix exponential, which may be defined by the following Taylor series with a matrix argument:

$$\exp M = \sum_{n=0}^{\infty} \frac{M^n}{n!} \quad \text{(equation 4)}$$

For 2×2 upper triangular matrices, the matrix exponential may be evaluated in closed form as follows:

$$\exp \begin{bmatrix} p & q \\ 0 & r \end{bmatrix} = \begin{cases} \begin{bmatrix} \exp p & \frac{\exp p - \exp r}{p - r}q \\ 0 & \exp r \end{bmatrix}, & \text{if } p \neq r \\ \begin{bmatrix} \exp p & q \exp p \\ 0 & \exp p \end{bmatrix}, & \text{if } p = r \end{cases} \quad \text{(equation 5)}$$

This allows derivation of the Lie group Ov's exponential map and its inverse. To compute the inverse, let:

$$\log A = \begin{bmatrix} p & q \\ 0 & r \end{bmatrix} \quad \text{(equation 6)}$$

Then, the following equation is solved for log A:

$$\exp \log A = \begin{bmatrix} \overline{\alpha} & a \\ 0 & 1 \end{bmatrix} \quad \text{(equation 7)}$$

In both cases of equation 4, exp r=1, so r=0. When p≠r, $$\exp \log A = \begin{bmatrix} \exp p & \frac{\exp p - 1}{p}q \\ 0 & 1 \end{bmatrix} = \begin{bmatrix} \overline{\alpha} & a \\ 0 & 1 \end{bmatrix} \quad \text{(equation 8)}$$

Pulling this apart component wise, the result is exp $p=\overline{\alpha}$, which means that $p=\log \overline{\alpha}$. Substituting this into equation 8 produces the following:

$$a = \frac{\exp p - 1}{p}q = -\frac{\alpha}{\log \overline{\alpha}}q \quad \text{(equation 9)}$$

Therefore:

$$q = -\frac{\log \overline{\alpha}}{a}a \quad \text{(equation 10)}$$

In the other case, when p=r, r=0, so p=0, and immediately the result is q=a. In summary:

$$\log A = \begin{cases} \begin{bmatrix} \log \overline{\alpha} & -\frac{\log \overline{\alpha}}{\alpha}a \\ 0 & 0 \end{bmatrix}, & \text{if } \alpha \neq 0 \\ \begin{bmatrix} 0 & a \\ 0 & 0 \end{bmatrix}, & \text{if } \alpha = 0 \end{cases} \quad \text{(equation 11)}$$

Generally, log A does not have the form of a pixel value. But, it is a member of the Lie algebra of the Over group, which is not isomorphic to the Lie group Ov. For invertible pixel values (e.g., those with α<1), log A is a well-behaved one-to-one function. Thus, the exponential map from equation 5 may be expressed as:

$$\exp\begin{bmatrix} p & q \\ 0 & 0 \end{bmatrix} = \begin{cases} \begin{bmatrix} \exp p & -\frac{\overline{\exp p}}{p} q \\ 0 & 1 \end{bmatrix}, & \text{if } p \neq 0 \\ \begin{bmatrix} 1 & q \\ 0 & 1 \end{bmatrix}, & \text{if } p = 0 \end{cases} \quad \text{(equation 12)}$$

Herein, members of the Lie algebra ov are written as vectors in double square brackets, as in the following:

$$[\![q, p]\!] \stackrel{def}{=} \begin{bmatrix} p & q \\ 0 & 0 \end{bmatrix} \quad \text{(equation 13)}$$

Therefore:

$$\exp[\![q, p]\!] = \begin{cases} \left[\!\left[ -\frac{\overline{\exp p}}{p} q, \overline{\exp p} \right]\!\right], & \text{if } p \neq 0 \\ [\![q, 0]\!], & \text{if } p = 0 \end{cases} \quad \text{(equation 14)}$$

And:

$$\log[\![a, \alpha]\!] = \begin{cases} \left[\!\left[ -\frac{\log \overline{\alpha}}{\alpha} a, \log \overline{\alpha} \right]\!\right], & \text{if } \alpha \neq 0 \\ [\![a, 0]\!], & \text{if } \alpha = 0 \end{cases} \quad \text{(equation 15)}$$

Since exp and log are bijections, the Lie algebra ov can be thought of as a different coordinatization of the Lie group Ov. Using the Lie algebra ov, splitting and mixing functions may be defined for merging deep images.

The splitting function may be referred to as $A^\lambda$, where A is the pixel value assigned to the interval being split, and λ is the fraction of the interval at which the splitting is performed. Generally, the splitting function satisfies the following identities:

$A^0$=clear  (equation 16)

$A^1$=A  (equation 17)

$A^u$ over $A^v$=$A^{u+v}$  (equation 18)

$(A^u)^v$=$A^{uv}$  (equation 19)

$A^\lambda$ may therefore be defined by the following equation:

$$A^\lambda \stackrel{def}{=} \exp(\lambda \log A) \quad \text{(equation 20)}$$

The splitting function may therefore be rewritten as:

$$A^\lambda = \begin{cases} \frac{1-\overline{\alpha}^\lambda}{\alpha} A & \text{if } \alpha \neq 0 \\ \lambda A & \text{if } \alpha = 0 \end{cases}, \quad \text{(equation 21)}$$

The mixing function may be represented to by the $\otimes$ operator, such as A$\otimes$B. The order in which objects such as clouds or murky water are mixed should not matter. Therefore, the mixing function should be commutative and associative, such that:

$A \otimes B = B \otimes A$  (equation 22)

$A \otimes (B \otimes C) = (A \otimes B) \otimes C$  (equation 23)

The mixing function works if the depth resolution by which the cloud is sampled is increased. Supposing there are two stacks of size n of copies of A and B, it should not matter whether the stacks of $A^n$ and $B^n$ are created then mixed, or whether A and B are mixed and then n copies of the result are stacked up. That is, the mixing function satisfies:

$A^n \otimes B^n = (A \otimes B)^n$  (equation 24)

This requirement may be referred to as splitting invariance, which is a correctness criterion for computations on pixel values. Informally, splitting invariance captures the notion that the result of the computation should depend on the image being sampled, and that increasing the sampling rate should not cause the result to change.

Mixing powers of a given color work according to the following equation:

$A^p \otimes A^q = A^{p+q}$  (equation 25)

Equations 22-25 are not enough to uniquely determine the mixing function. However, if we are given its value in an appropriate limiting case, equations 22-25 are sufficient to determine the function for all other argument values. For example, a white light (e.g., a pixel value [1, 0]) may be uniformly distributed in a volume of non-emissive haze (with pixel value [0, α]). At every relative depth λ in the volume, the infinitesimal light emitted at that depth is attenuated by $\overline{\alpha}^\lambda$, so the total light emitted is determined by:

$\int_0^1 \overline{\alpha}^\lambda d\lambda = -\alpha/\log(\overline{\alpha})$  (equation 26)

In other words:

$$[1, 0] \otimes [0, \alpha] = \left[ -\frac{\alpha}{\log(\overline{\alpha})}, \alpha \right] \quad \text{(equation 27)}$$

The only function that satisfies equations 22-27 is:

$$A \otimes B \stackrel{def}{=} \exp(\log A + \log B) \quad \text{(equation 28)}$$

However, equation 28 only defines A$\otimes$B when A and B are not opaque. However, as A approaches opacity, the equation A$\otimes$B=A is a solution. If both A and B are opaque, letting A$\otimes$B=[a+b, 1] satisfies the identities of equations 22-25, and works well in practice.

Since operations in the Lie algebra ov are linear, linear interpolation of pixel values may be defined by mapping the pixel values from the Lie group Ov to the Lie algebra ov, linearly interpolating the result, and mapping back to the Lie group Ov, as described below in equation 30. For example, the equation:

$A^n = \exp(n \log A)$  (equation 29)

Suggests expressing linear interpolation between pixel values. Thus:

$lerp(A,B,t) = \exp((1-t)\log A + t \log B)$  (equation 30)

As in equation 24, equation 30 satisfies a subdivision identity, such that:

$$lerp(A^n, B^n, t^n) = lerp(A, B, t)^n \qquad \text{(equation 31)}$$

Also:

$$lerp(A^p, A^q t) = A^{(1-t)p+q} \qquad \text{(equation 32)}$$

In cases where $\alpha = \beta$:

$$lerp(A, B, t) = [(1-t)a + tb, \alpha] \qquad \text{(equation 33)}$$

B-splines and Bezier curves are naturally defined by repeated linear interpolations (lerps), so the linear interpolation formula provides well-behaved formulations of pixel-valued B-splines and Bezier curves. For example, a pixel-valued Bezier curve may be defined by:

$$S(t) = \exp\left(\sum_{i=0}^{n} b_{i,n}(t) \log B_i\right) \qquad \text{(equation 34)}$$

In equation 34, $B_i$ are the Bezier curve's control values and $b_{i,n}(t)$ are the Bernstein polynomials of degree n. Equation 34 may be evaluated using de Casteljau's algorithm:

$$B_i^{(0)} = B_i \qquad \text{(equation 35)}$$

$$B_i^{(j)} = lerp(B_i^{(j-1)}, B_{i+1}^{(j-1)} t) \qquad \text{(equation 36)}$$

$$S(t) = B_0^{(n)} \qquad \text{(equation 37)}$$

Many of the logarithms and exponents hidden in the linear interpolation cancel out. Generally, therefore, embodiments disclosed herein take the logarithms of the control points, make a component wise spline from the control points, and take the exponential of the result. This schema works equally well for all B-splines using de Boor's algorithm and for any other spline formulation in which the spline value is a linear combination of the control points, such as Catmull-Rom splines, or beta-splines. All such schemas satisfy equations analogous to 31-33. Furthermore:

$$s(A_1, t_1, \ldots, A_n, t_n) = \exp \sum_{i=1}^{n} t_i \log A_i \qquad \text{(equation 38)}$$

In equation 38, $A_i$ for $1 \leq i \leq n$ is a sequence of pixel values, and $t_i$ is a corresponding sequence of weights, then the following equation may be verified:

$$s(A_1^k, t_1, \ldots, A_n^k, t_n) = s(A_1, t_1, \ldots, A_n, t_n)^k \qquad \text{(equation 39)}$$

Furthermore:

$$s(A_1^k, t_1, \ldots, A_n^k, t_n) = A^{\sum_{i=1}^{n} t_j k_i} \qquad \text{(equation 40)}$$

Provided all alpha values are the same:

$$\alpha_i = \alpha \qquad \text{(equation 41)}$$

And the weights produce an affine combination:

$$\sum_{i=1}^{n} t_i = 1 \qquad \text{(equation 42)}$$

Then:

$$s(A_1, t_1, \ldots, A_n, t_n) = \left[\sum_{i=1}^{n} t_i a_i, \alpha\right] \qquad \text{(equation 43)}$$

Figure 1A:
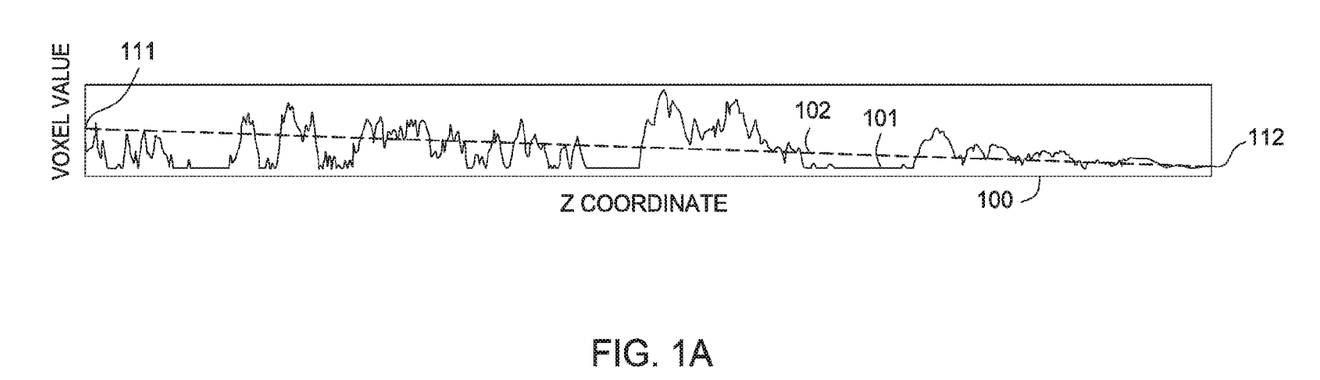
FIGS. 1A-1D reflect the stages of a recursive approximation algorithm used to compress a volumetric data set, according to one embodiment.

FIG. 1A is a graph 100 depicting a first stage of compressing a volumetric data set using a recursive approximation algorithm, according to one embodiment. Generally, the x-axis of the graph 100 represents the z-coordinate of a voxel column in a volumetric data set, while the y-axis represents a voxel value for each voxel in the column. Therefore, the graph 100 reflects the voxel values for all z in a fixed x and y of a single column in a deep image. As shown, the graph 100 includes a curve 101 corresponding to actual (or uncompressed) value for each voxel in the voxel column, while a curve 102 represents an approximation of the voxel value for each voxel in the voxel column. The actual voxel values in the curve 101 may be based on RGBA values of a voxel array representing the deep image, which are converted from the Over group to the Lie algebra ov. Generally, the RGBA values are converted using an exponential mapping function. In one embodiment, the log map of equation 15 is used to perform the exponential map. The approximation curve 102 in FIG. 1A is based on a linear interpolation between two endpoints 111 and 112, where the linear interpolation is based on equation 30. The endpoints 111 and 112 correspond to the leftmost and rightmost voxel values (e.g., the top and bottom voxels in the voxel column).

The recursive approximation algorithm disclosed herein considers the deviation of each linearly approximated voxel value (curve 102) between the endpoints 111, 112 relative to the actual value (curve 101). If the deviation (e.g., the difference) of all approximated voxel values relative to the actual value does not exceed a predefined threshold tolerance value, the approximation is adequate for image compression, and the endpoints (and their corresponding voxel values) are stored. However, if the deviation of one or more approximated voxel values exceeds the threshold, the recursive approximation algorithm adds a breakpoint at the voxel where the deviation is greatest, thereby splitting the curve 102 into two segments at that value.

Figure 1B:
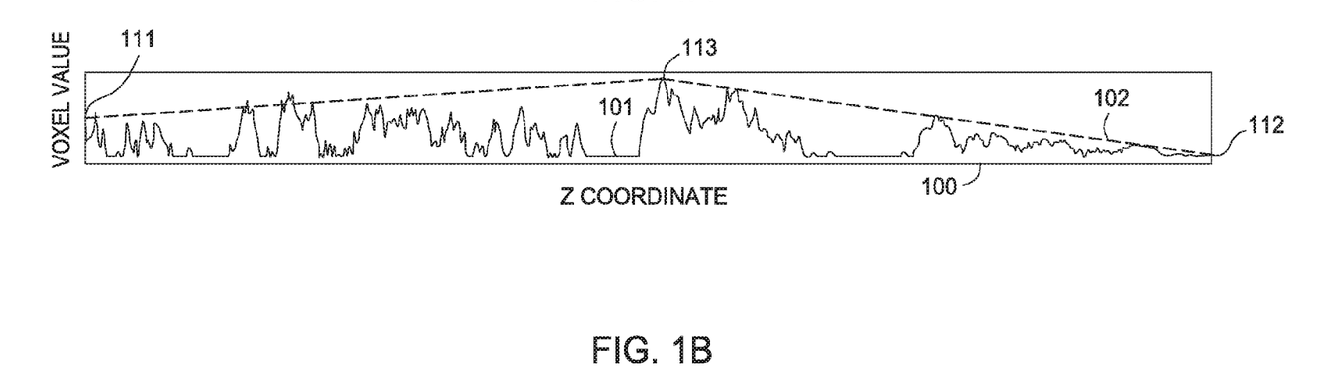

FIG. 1B depicts the addition of breakpoint 113 at the voxel having the greatest deviation between the approximation of curve 102 and the actual voxel value of curve 101. The recursive approximation algorithm may add the breakpoint 113 upon determining that the approximated voxel value of curve 102 at point 113 differs from the value of curve 101 at point 113 more than the deviation of any other approximated voxel values. The recursive approximation algorithm may now consider two segments of curve 102, namely the segment created by endpoints 111 and 113, and the segment created by endpoints 113 and 112. The two segments of curve 102 are created by linearly interpolating the values between the endpoints of the respective segment using equation 30. For each segment, the recursive approximation algorithm again considers whether the deviation of the linearly approximated voxel values of curve 102 exceed the predefined threshold. If the deviation of all voxel values is within the threshold, the algorithm stops subdividing the segment. If one or more voxel values of curve 102 exceed the threshold, the recursive approximation algorithm identifies the voxel value having the greatest deviation, and adds another breakpoint at this identified voxel.

Figure 1C:
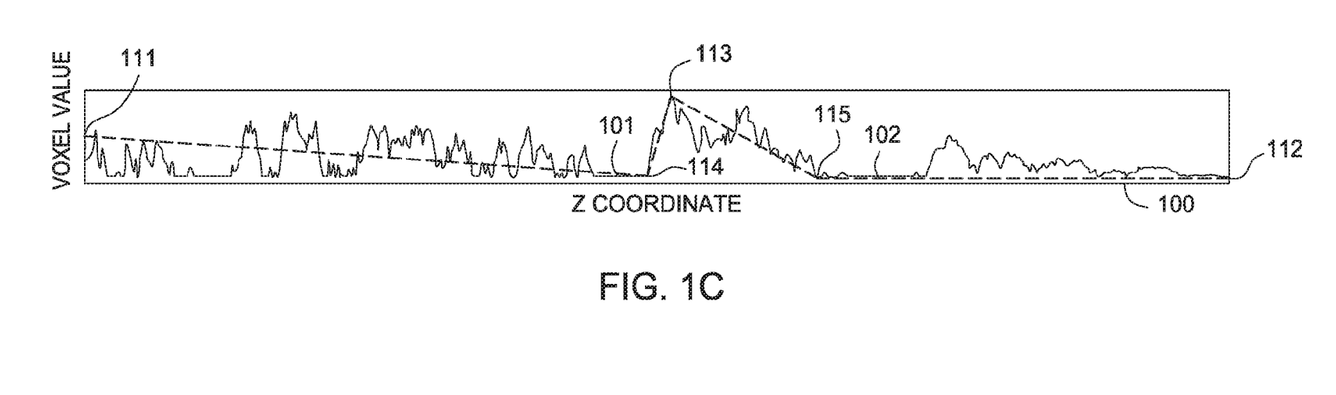

FIG. 1C reflects the addition of two additional breakpoints to the graph 100 of FIG. 1B. As shown, breakpoints 114 and 115 have been added to the graph 100, as the approximated voxel values at breakpoints 114 and 115 were identified as having the greatest deviation for all approximated voxel values in the curve segments defined by breakpoints 111 and 113, and 113 and 112, respectively. Doing so creates segments defined by breakpoints 111 and 114, 114 and 113, 113 and 115, and 115 and 112. Therefore, the approximation curve 102 now has four different segments, each created by linearly interpolation of the respective endpoints using equation 30. The recursive approximation algorithm may then consider each of the four segments as described above. For each of the four segments, the algorithm considers whether the linearly approximated values of the curve 102 deviate from the actual voxel values of curve 101. If the approximated values of curve 102 deviate beyond a threshold, the algorithm again adds a breakpoint at the voxel value having the highest deviation, and so on. For the sake of clarity, all stages of the recursive algorithm are not depicted, as the recursive algorithm may require dozens of iterations to fully converge.

Figure 1D:
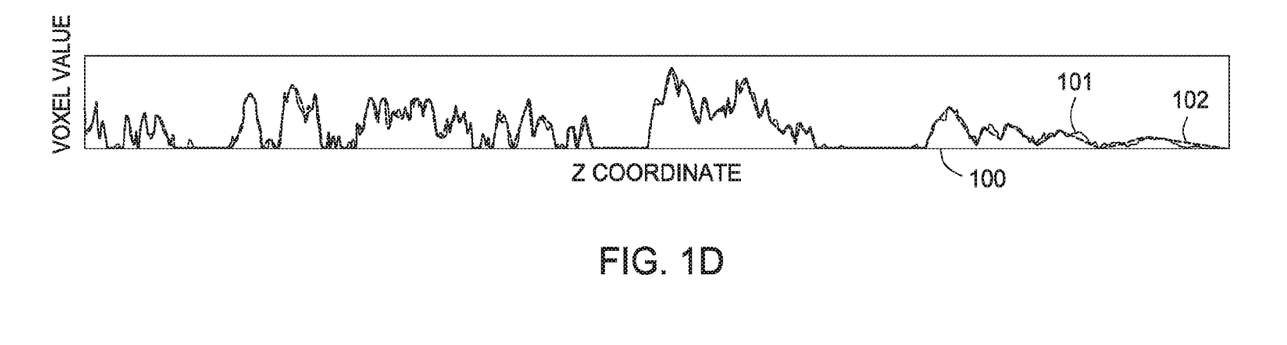

FIG. 1D reflects a fully converged final approximation of the voxel values for each voxel in the voxel column. As shown, the curve 102 is now a closer fit to curve 101, as the approximated voxel values of curve 102 are within the tolerance threshold. The recursive algorithm may be applied to each voxel column in the voxel array representing the deep image. The breakpoints (which include the initial endpoints) generated using the recursive algorithm (and their corresponding voxel values) may be stored as a compressed deep image. These stored values may later be used to reproduce an approximation to the deep image by performing a linear interpolation between each breakpoint using equation 30, converting the interpolated values from the Lie algebra to the Over group using the exponential function of equation 12, and compositing each pixel over the next.

Figure 2:
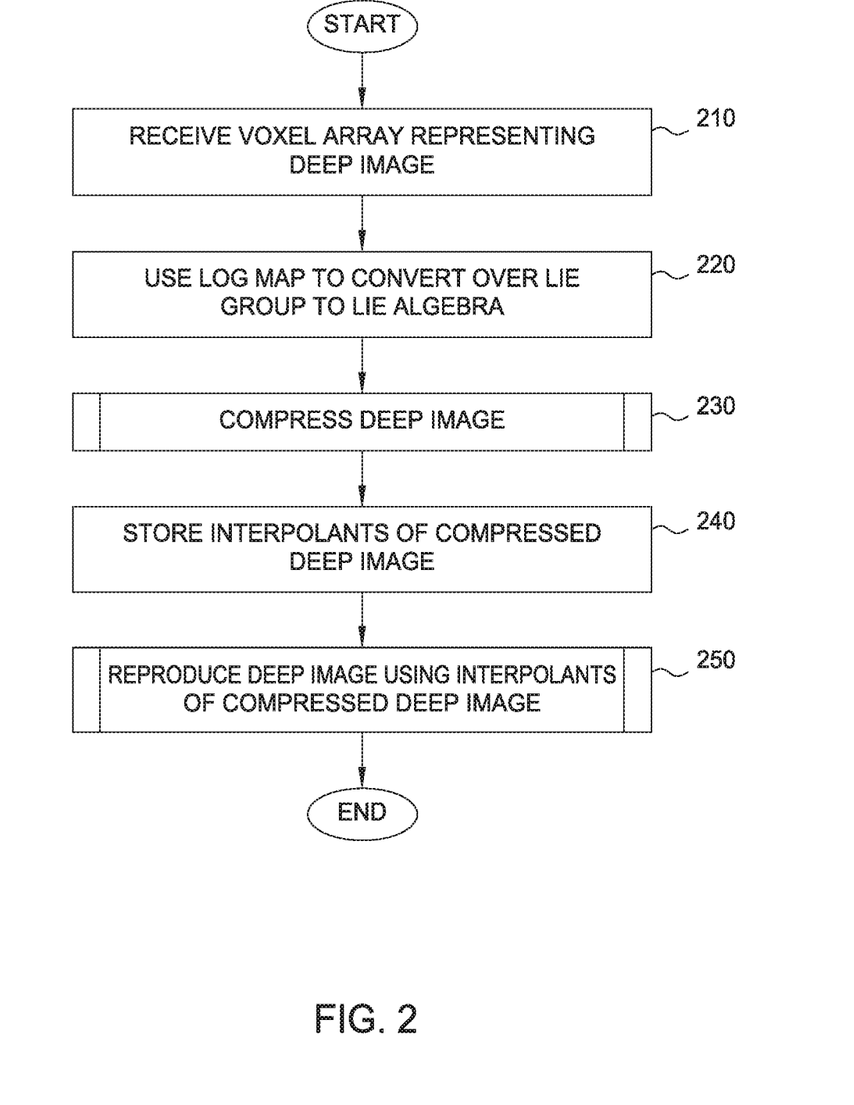
FIG. 2 is a flow chart illustrating a method to compress deep images using Lie algebras, according to one embodiment.

FIG. 2 is a flow chart illustrating a method 200 to compress deep images using Lie algebras, according to one embodiment. Generally, a system implementing the method 200 may use Lie algebras to achieve better compression rates for deep images. By achieving better compression rates, the performance of the system is improved. Similarly, the field of deep image compression is improved by these better compression rates. As shown, the method 200 begins at block 210, where the system may receive a voxel (or pixel) array representing a deep image, where the voxel array specifies RGBA values for each voxel in the deep image. The deep image may have objects (or other elements) whose pixels may occupy extended depth regions. At block 220, the system may use equation 15 to convert the RGBA voxel values of the Over Lie group (Ov) to a Lie algebra (ov). At block 230, described in greater detail with reference to FIG. 3, the system may compress the deep image. Generally, in compressing the deep image, the system may construct interpolants to each voxel's column by recursive binary subdivision. For a given range of voxels in the column, the system may identify the voxel that deviates most from the interpolant determined by the range's endpoints. If the deviation is below a threshold, the subdivision process ends. If the deviation is above a threshold (and a better interpolant is needed), a breakpoint is added at the voxel, and the two subhalves created by the breakpoint are recursively subdivided. At block 240, the system may store the interpolants and corresponding voxel values of the compressed deep image. Doing so allows the system to reproduce the deep image using the interpolants of the compressed deep image at block 250, described in greater detail with reference to FIG. 4.

Figure 3:
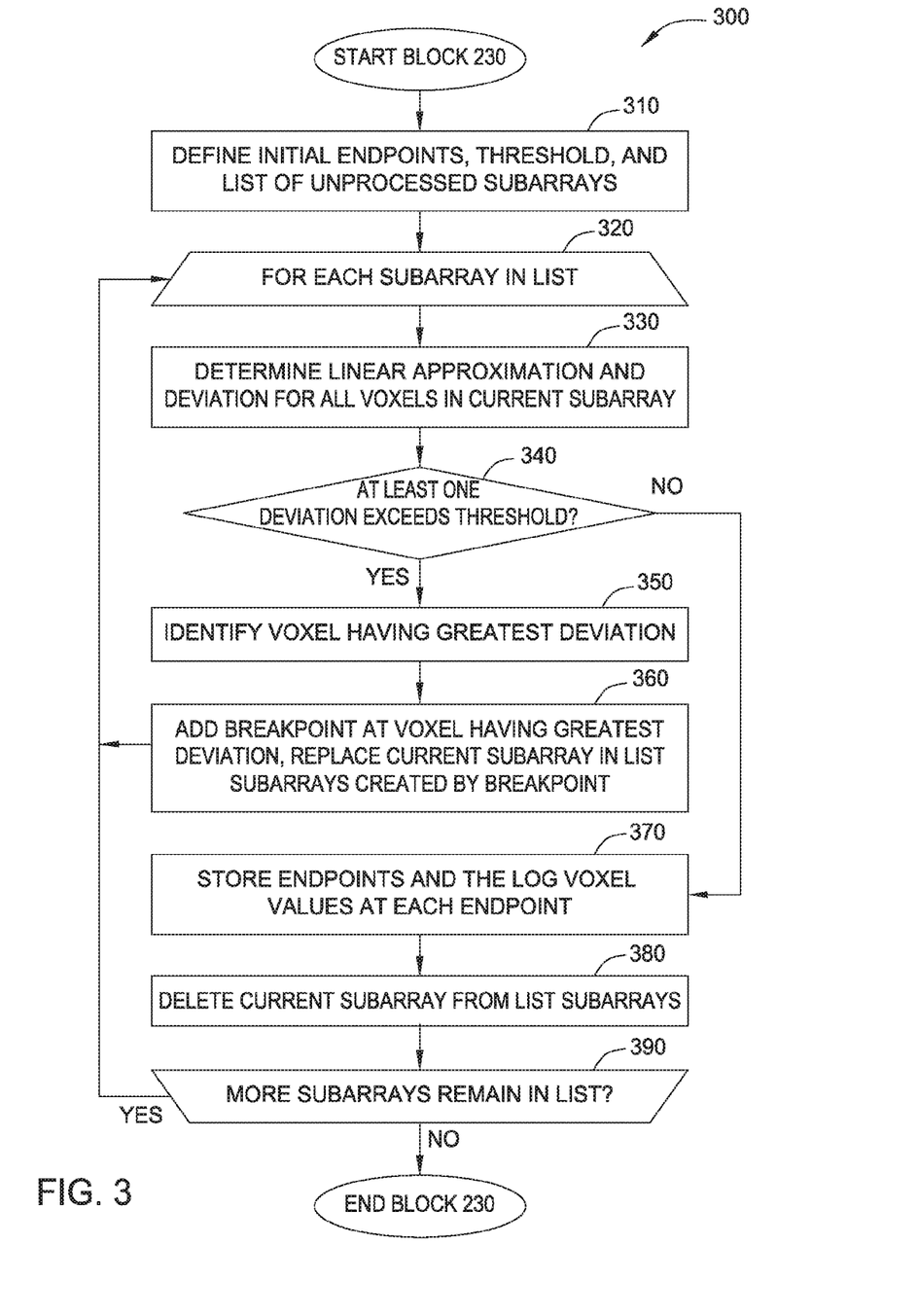
FIG. 3 is a flow chart illustrating a method to compress a deep image, according to one embodiment.

FIG. 3 is a flow chart illustrating a method 300 corresponding to block 230 to compress a deep image, according to one embodiment. As shown, the method 300 begins at block 310, where initial endpoints, at least one threshold value, and a list of unprocessed subarrays are defined. The list of unprocessed subarrays may initially be defined to include one element, the whole voxel array. In one embodiment, the list may be represented implicitly by the recursion stack of a recursive implementation, where adding elements would be represented by recursive calls, and removing elements from the list is represented by returning to a previous activation. In at least one embodiment, the initial endpoints may be defined as the first and last voxels in each voxel column of the deep image that has been converted to the Lie algebra ov. The threshold value may reflect a level of tolerance for error in compressing the image, and may be a user-defined value or a default value.

At block 320, the system may execute a loop including blocks 330-380 for each subarray in the list of unprocessed subarrays. At block 330, the system may determine the linear approximation and deviation for the each voxel in the current subarray. In at least one embodiment, the linear approximation may be generated based on equation 30 applied to the current endpoints (and/or breakpoints). For example, in the initial iteration of the method 300, the linear interpolation will be based on the initial endpoints defined at block 310. However, as the recursive algorithm proceeds with subsequent iterations, the endpoints and/or breakpoints which define the subarrays are used. The deviation for the voxels may be based on the difference between the approximated value of the voxel value and the actual (uncompressed) voxel value. In at least one embodiment, the deviation may be based on one or more of the red, green, blue, or alpha values for the voxel.

At block 340, the system may determine whether the deviation of the linear interpolation for at least one voxel value exceeds the threshold. If the deviation of at least one voxel value in the current subarray exceeds the threshold, the method proceeds to block 350. At block 350, the system may identify the voxel having the greatest deviation. At block 360, the system may add a breakpoint at the voxel having the greatest deviation, and replace the current subarray in the list of subarrays with the two subarrays created by adding the breakpoint at the voxel having the greatest deviation. An example breakpoint is breakpoint 113 of FIG. 1B. The system may then return to block 320, where the loop including blocks 330-380 is performed for each subarray created by the added breakpoint.

Returning to block 340, if the deviation does not exceed the threshold, the method proceeds to block 370. At block 370, the system may store the endpoints and log voxel values at each endpoint of the current subarray. At block 380, the system may delete the current subarray from the list of subarrays. At block 390, the system may determine whether more subarrays in the list of subarrays remain. If more subarrays remain, the recursive algorithm returns to block 320 to process the remaining subarrays. Otherwise, the method 300 ends.

Figure 4:
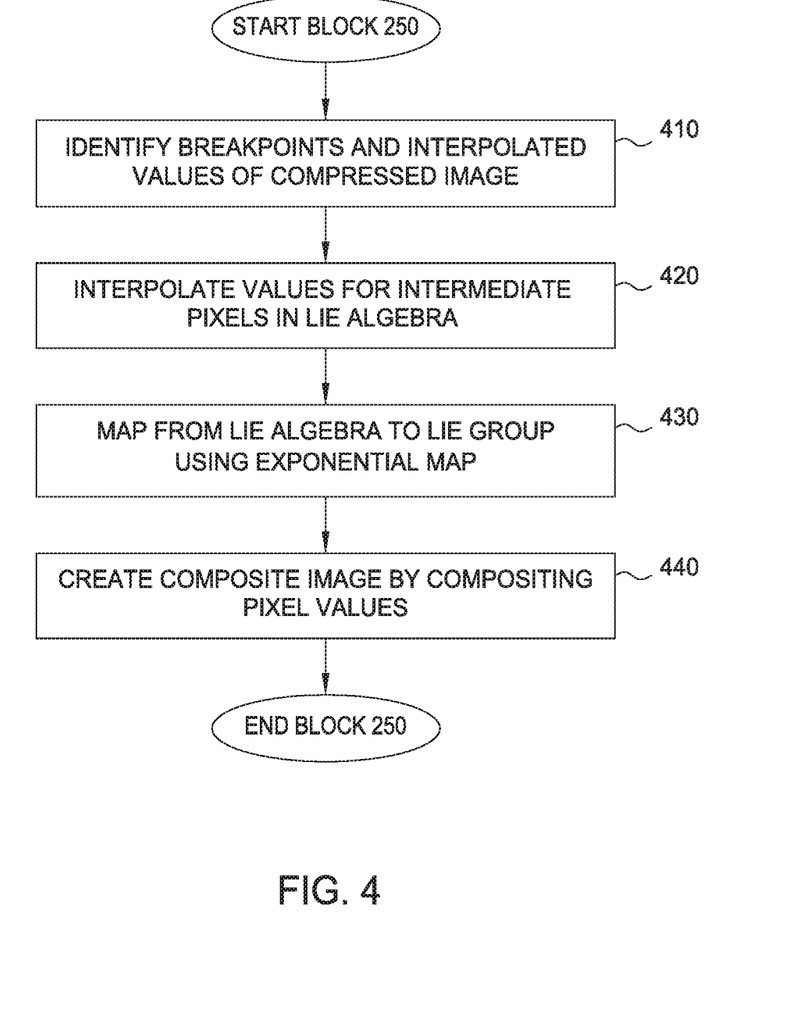
FIG. 4 is a flow chart illustrating a method to reproduce a deep image using interpolants of a compressed deep image, according to one embodiment.

FIG. 4 is a flow chart illustrating a method 400 corresponding to block 250 to reproduce a deep image using interpolants of a compressed deep image, according to one embodiment. As shown, the method begins at block 410, where the system may identify the breakpoints and interpolated values of the compressed image generated using the recursive subdivision algorithm described above. At block 420, the system may interpolate values for intermediate pixels in the Lie algebra. At block 430, the system may map the values generated at block 420 from the Lie algebra to the Lie group (e.g., the Over group) using the exponential map of equation 5. At block 440, the system may create an approximation of the composite image by compositing the pixel values mapped from the Lie algebra to the Lie group at block 440.

Figure 5:
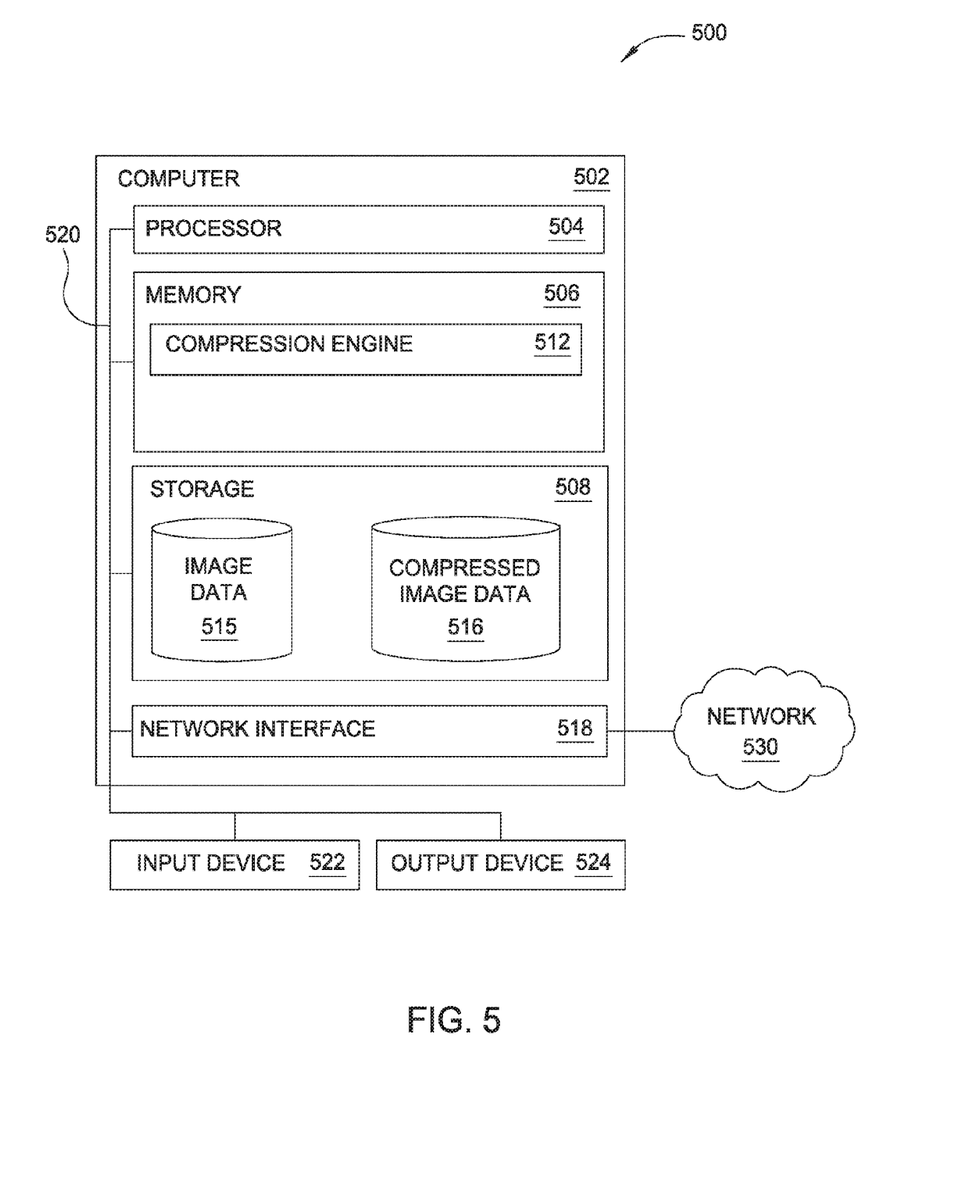
FIG. 5 is a block diagram illustrating a system configured to compress deep images using Lie algebras, according to one embodiment.

FIG. 5 is a block diagram illustrating a system 500 configured to compress deep images using Lie algebras, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the compression engine 512, which is an application generally configured to compress deep images using Lie algebras, as described in greater detail above. Generally, the compression engine 512 is configured to implement all methods and functionality described herein. By implementing the compression techniques described herein, the performance of the computer 502 is improved by compressing deep images using better compression rates.

As shown, the storage 508 contains the image data 515 and the compressed image data 516. The image data 515 stores uncompressed deep image data that the compression engine 512 may use to compress the deep images. The compressed image data 516 stores compressed deep image data, which may include the interpolants generated by the compression engine 512 as described above.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for compressing a deep image comprising a plurality of voxels, comprising:
   for each of the plurality of voxels, converting, by a processor, a matrix representation of a voxel value to a corresponding value in a Lie algebra based on a logarithmic mapping function applied to a matrix exponential of the matrix representation of the voxel value, wherein each matrix representation of the voxel value is stored in a computer readable medium and represents digital computer graphics data;
   interpolating a first subset of the plurality of values in the Lie algebra using a linear interpolation function applied to a first endpoint and a second endpoint of a first voxel column of the deep image; and
   upon determining that a respective difference between the interpolation of each value in the first subset and the corresponding value in the first subset does not exceed a threshold, storing an indication of the first endpoint, the second endpoint, and the respective values in the Lie algebra corresponding to the first and second endpoints.

2. The method of claim 1, further comprising:
   upon determining that the difference between the interpolation of a first value in the first subset and a corresponding first value in the Lie algebra exceeds the threshold:
      creating a second subset and a third subset of the first subset of the plurality of values based on a breakpoint stored at the first value, wherein the second and third subsets are defined by the breakpoint and a respective one of the first and second endpoints; and
      for each of the second and third subsets of the first subset of values:
         interpolating the respective one of the second and third subsets using the linear interpolation function applied to the breakpoint and the respective one of the first and second endpoints; and
         upon determining that a difference between the interpolation of each value in the second and third subsets and the corresponding values in the Lie algebra do not exceed the threshold, storing an indication of the first endpoint, the second endpoint, the breakpoint, and the respective values in the Lie algebra corresponding to the first and second endpoints and the breakpoint.

3. The method of claim 2, wherein each voxel value comprises a red green blue alpha (RGBA) voxel value.

4. The method of claim 2, further comprising:
   determining that the difference between the interpolation of the first value in the first subset and the corresponding first value in the Lie algebra has the greatest deviation relative to the deviations differences of the interpolation of each remaining value in the first subset and the corresponding values in the Lie algebra.

5. The method of claim 1, wherein the method is performed for each of a plurality of voxel columns of the deep image, wherein each of the plurality of voxel columns comprises a respective plurality of stacked voxels in the z-dimension, wherein each of the plurality of stacked voxels belong to a respective image of a plurality of images that form the deep image.

6. The method of claim 1, further comprising recreating the deep image from the stored indications by:
identifying the first endpoint, the second endpoint, and the respective values in the Lie algebra corresponding to the first and second endpoints;
interpolating values for each voxel in the first voxel column in the Lie algebra based on the respective values corresponding to the first and second endpoints;
mapping each value in the Lie algebra for each voxel in the first voxel column to a respective Lie group value using an exponential mapping function applied to the values in the Lie algebra; and
compositing the respective Lie group values for each voxel in the first voxel column using an over function.

7. The method of claim 1, wherein the linear interpolation function comprises:

$$lerp(A,B,t)=\exp((1-t)\log A + t \log B),$$

wherein A comprises a value in the Lie algebra corresponding to the first endpoint, wherein B comprises a value in the Lie algebra corresponding to the second endpoint, wherein t comprises a weight value.

8. A non-transitory computer-readable storage medium having computer-readable program code embodied therewith, the computer-readable program code executable by a processor to perform an operation to compress a deep image comprising a plurality of voxels, the operation comprising:
for each of the plurality of voxels, converting a matrix representation of a voxel value to a corresponding value in a Lie algebra based on a logarithmic mapping function applied to a matrix exponential of the matrix representation of the voxel value;
interpolating a first subset of the plurality of values in the Lie algebra using a linear interpolation function applied to a first endpoint and a second endpoint of a first voxel column of the deep image; and
upon determining that a respective difference between the interpolation of each value in the first subset and the corresponding value in the first subset does not exceed a threshold, storing an indication of the first endpoint, the second endpoint, and the respective values in the Lie algebra corresponding to the first and second endpoints.

9. The computer-readable storage medium of claim 8, the operation further comprising:
upon determining that the difference between the interpolation of a first value in the first subset and a corresponding first value in the Lie algebra exceeds the threshold:
creating a second subset and a third subset of the first subset of the plurality of values based on a breakpoint stored at the first value, wherein the second and third subsets are defined by the breakpoint and a respective one of the first and second endpoints; and
for each of the second and third subsets of the first subset of values:
interpolating the respective one of the second and third subsets using the linear interpolation function applied to the breakpoint and the respective one of the first and second endpoints; and
upon determining that a difference between the interpolation of each value in the second and third subsets and the corresponding values in the Lie algebra do not exceed the threshold, storing an indication of the first endpoint, the second endpoint, the breakpoint, and the respective values in the Lie algebra corresponding to the first and second endpoints and the breakpoint.

10. The computer-readable storage medium of claim 9, wherein each voxel value comprises a red green blue alpha (RGBA) voxel value.

11. The computer-readable storage medium of claim 9, the operation further comprising:
determining that the difference between the interpolation of the first value in the first subset and the corresponding first value in the Lie algebra has the greatest deviation relative to the differences of the interpolation of each remaining value in the first subset and the corresponding values in the Lie algebra.

12. The computer-readable storage medium of claim 8, wherein the operation is performed for each of a plurality of voxel columns of the deep image, wherein each of the plurality of voxel columns comprises a respective plurality of stacked voxels in the z-dimension, wherein each of the plurality of stacked voxels belong to a respective image of a plurality of images that form the deep image.

13. The computer-readable storage medium of claim 8, the operation further comprising recreating the deep image from the stored indications by:
identifying the first endpoint, the second endpoint, and the respective values in the Lie algebra corresponding to the first and second endpoints;
interpolating values for each voxel in the first voxel column in the Lie algebra based on the respective values corresponding to the first and second endpoints;
mapping each value in the Lie algebra for each voxel in the first voxel column to a respective Lie group value using an exponential mapping function applied to the values in the Lie algebra; and
compositing the respective Lie group values for each voxel in the first voxel column using an over function.

14. The computer-readable storage medium of claim 8, wherein the linear interpolation function comprises:

$$lerp(A,B,t)=\exp((1-t)\log A + t \log B),$$

wherein A comprises a value in the Lie algebra corresponding to the first endpoint, wherein B comprises a value in the Lie algebra corresponding to the second endpoint, wherein t comprises a weight value.

15. A system, comprising:
a processor; and
a memory storing a program, which when executed by the processor, performs an operation to compress a deep image comprising a plurality of voxels, the operation comprising:
for each of the plurality of voxels, converting a matrix representation of a voxel value to a corresponding value in a Lie algebra based on a logarithmic mapping function applied to a matrix exponential of the matrix representation of the voxel value;
interpolating a first subset of the plurality of values in the Lie algebra using a linear interpolation function applied to a first endpoint and a second endpoint of a first voxel column of the deep image; and
upon determining that a respective difference between the interpolation of each value in the first subset and the corresponding value in the first subset does not exceed a threshold, storing an indication of the first endpoint, the second endpoint, and the respective values in the Lie algebra corresponding to the first and second endpoints.

16. The system of claim 15, the operation further comprising:

upon determining that the difference between the interpolation of a first value in the first subset and a corresponding first value in the Lie algebra exceeds the threshold:

creating a second subset and a third subset of the first subset of the plurality of values based on a breakpoint stored at the first value, wherein the second and third subsets are defined by the breakpoint and a respective one of the first and second endpoints; and for each of the second and third subsets of the first subset of values:

interpolating the respective one of the second and third subsets using the linear interpolation function applied to the breakpoint and the respective one of the first and second endpoints; and upon determining that a difference between the interpolation of each value in the second and third subsets and the corresponding values in the Lie algebra do not exceed the threshold, storing an indication of the first endpoint, the second endpoint, the breakpoint, and the respective values in the Lie algebra corresponding to the first and second endpoints and the breakpoint.

17. The system of claim 16, wherein each voxel value comprises a red green blue alpha (RGBA) voxel value.

18. The system of claim 16, the operation further comprising:

determining that the difference between the interpolation of the first value in the first subset and the corresponding first value in the Lie algebra has the greatest deviation relative to the differences of the interpolation of each remaining value in the first subset and the corresponding values in the Lie algebra.

19. The system of claim 15, wherein the operation is performed for each of a plurality of voxel columns of the deep image, wherein each of the plurality of voxel columns comprises a respective plurality of stacked voxels in the z-dimension, wherein each of the plurality of stacked voxels belong to a respective image of a plurality of images that form the deep image.

20. The system of claim 15, the operation further comprising recreating the deep image from the stored indications by:

identifying the first endpoint, the second endpoint, and the respective values in the Lie algebra corresponding to the first and second endpoints;

interpolating values for each voxel in the first voxel column in the Lie algebra based on the respective values corresponding to the first and second endpoints;

mapping each value in the Lie algebra for each voxel in the first voxel column to a respective Lie group value using an exponential mapping function applied to the values in the Lie algebra; and compositing the respective Lie group values for each voxel in the first voxel column using an over function.

* * * * *

UNITED STATES PATENT AND TRADEMARK OFFICE
CERTIFICATE OF CORRECTION

PATENT NO. : 10,013,775 B2
APPLICATION NO. : 15/135392
DATED : July 3, 2018
INVENTOR(S) : Thomas Douglas Selkirk Duff Page 1 of 1

It is certified that error appears in the above-identified patent and that said Letters Patent is hereby corrected as shown below:

In the Specification

In Column 1, Line 32, delete "a" and insert -- α --, therefor.

In Column 3, Line 8, delete "a" and insert -- α --, therefor.

In Column 3, Line 16, delete "a" and insert -- α --, therefor.

In Column 5, Line 51, delete "($A^u$)" and insert -- ($A^u$)$^v$ --, therefor.

In Column 7, Line 8, delete "$lerp(A^p, A^q t) = A^{(1-t)p+q}$" and insert -- $lerp(A^p, A^q, t) = A^{(1-t)p+tq}$ --, therefor.

In Column 7, Lines 29-30, delete "$B_i^{(j)} = lerp(B_i^{(j-1)}, B_{i+1}^{(j-1)} t)$," and insert -- $B_i^{(j)} = lerp\left(B_i^{(j-1)}, B_{i+1}^{(j-1)}, t\right)$ --, therefor.

In the Claims

In Column 14, Line 65, in Claim 4, before "differences" delete "deviations".

Signed and Sealed this
Twelfth Day of March, 2019

Andrei Iancu
*Director of the United States Patent and Trademark Office*